(12) United States Patent
Hecht et al.

(10) Patent No.: US 9,564,125 B2
(45) Date of Patent: Feb. 7, 2017

(54) METHODS AND SYSTEMS FOR ADAPTING A SPEECH SYSTEM BASED ON USER CHARACTERISTICS

(71) Applicant: GM GLOBAL TECHNOLOGY OPERATIONS LLC, Detroit, MI (US)

(72) Inventors: Ron M. Hecht, Raanana (IL); Timothy J. Grost, Clarkston, MI (US); Robert D. Sims, III, Milford, MI (US); Ute Winter, Petach Tiqwa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 236 days.

(21) Appl. No.: 14/059,877

(22) Filed: Oct. 22, 2013

(65) Prior Publication Data

US 2014/0136201 A1   May 15, 2014

Related U.S. Application Data

(60) Provisional application No. 61/725,802, filed on Nov. 13, 2012.

(51) Int. Cl.
  *G10L 15/22* (2006.01)
  *G10L 15/18* (2013.01)
  *G10L 15/065* (2013.01)
  *G10L 15/183* (2013.01)

(52) U.S. Cl.
  CPC ............ *G10L 15/065* (2013.01); *G10L 15/183* (2013.01); *G10L 15/22* (2013.01)

(58) Field of Classification Search
  CPC .............................. G10L 15/22; G10L 14/183
  See application file for complete search history.

(56) References Cited

U.S. PATENT DOCUMENTS

| | | | |
|---|---|---|---|
| 5,864,810 A * | 1/1999 | Digalakis et al. | 704/255 |
| 6,188,976 B1 * | 2/2001 | Ramaswamy et al. | 704/9 |
| 6,587,824 B1 * | 7/2003 | Everhart | G10L 15/07 704/243 |
| 6,665,644 B1 | 12/2003 | Kanevsky et al. | |
| 7,263,489 B2 * | 8/2007 | Cohen et al. | 704/270 |
| 7,457,745 B2 * | 11/2008 | Kadambe et al. | 704/216 |
| 2005/0165602 A1 * | 7/2005 | Cote et al. | 704/9 |
| 2006/0206333 A1 * | 9/2006 | Paek et al. | 704/260 |
| 2007/0083374 A1 * | 4/2007 | Bates | G10L 15/197 704/257 |

(Continued)

FOREIGN PATENT DOCUMENTS

| | | |
|---|---|---|
| CN | 1448915 A | 10/2003 |
| CN | 101075434 A | 11/2007 |

(Continued)

OTHER PUBLICATIONS

Chinese Patent and Trade Mark Office, Office Action for Chinese Patent Application No. 201310757116.5, mailed Feb. 2, 2016.

(Continued)

*Primary Examiner* — Jialong He

(74) *Attorney, Agent, or Firm* — Lorenz & Kopf, LLP

(57) ABSTRACT

Methods and systems are provided for adapting a speech system. In one example a method includes: logging speech data from the speech system; detecting a user characteristic from the speech data; and selectively updating a language model based on the user characteristic.

14 Claims, 10 Drawing Sheets

(56) References Cited

U.S. PATENT DOCUMENTS

| | | | |
|---|---|---|---|
| 2007/0208555 A1* | 9/2007 | Blass | G06F 17/27 704/9 |
| 2007/0233487 A1 | 10/2007 | Cohen et al. | |
| 2008/0004880 A1* | 1/2008 | Acero et al. | 704/270.1 |
| 2011/0099013 A1* | 4/2011 | Melamed et al. | 704/255 |
| 2012/0053935 A1* | 3/2012 | Malegaonkar et al. | 704/235 |
| 2014/0039893 A1* | 2/2014 | Weiner | 704/249 |

FOREIGN PATENT DOCUMENTS

| | | | | |
|---|---|---|---|---|
| CN | 102280106 A | | 12/2011 | |
| CN | 103186607 A | | 7/2013 | |
| EP | 1320086 | * | 6/2003 | G10L 15/18 |

OTHER PUBLICATIONS

State Intellectual Property Office of the People's Republic of China, Office Action in Chinese Patent Application No. 201310757116.5 mailed Dec. 2, 2016.

\* cited by examiner

METHODS AND SYSTEMS FOR ADAPTING A SPEECH SYSTEM BASED ON USER CHARACTERISTICS

CROSS REFERENCE TO RELATED APPLICATIONS

This application claims the benefit of U.S. Provisional Application No. 61/725,802 filed Nov. 13, 2012, which is hereby incorporated by reference in its entirety.

TECHNICAL FIELD

The technical field generally relates to speech systems, and more particularly relates to methods and systems for adapting components of speech systems based on data determined from user interactions and/or from one or more systems, for example, of a vehicle.

BACKGROUND

Vehicle speech systems perform speech recognition on speech uttered by an occupant of the vehicle. The speech utterances typically include commands that control one or more features of the vehicle or other systems accessible by the vehicle. The speech systems utilize generic recognition techniques such that speech utterances from any occupant of the vehicle can be recognized. Speech dialog systems manage a dialog with a user of the vehicle based on the commands. The dialog is typically generic for all users.

Accordingly, it is desirable to provide methods and systems for adapting vehicle speech systems based on the occupant of the vehicle and/or the contextual environment of the vehicle and/or the occupant. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for adapting a speech system. In one example a method includes: logging speech data from the speech system; detecting a user characteristic from the speech data; and selectively updating a language model based on the user characteristic.

In another example, a system includes a first module that logs speech data from the speech system. A second module detects a user characteristic from the speech data. A third module selectively updates a language model based on the user characteristic.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
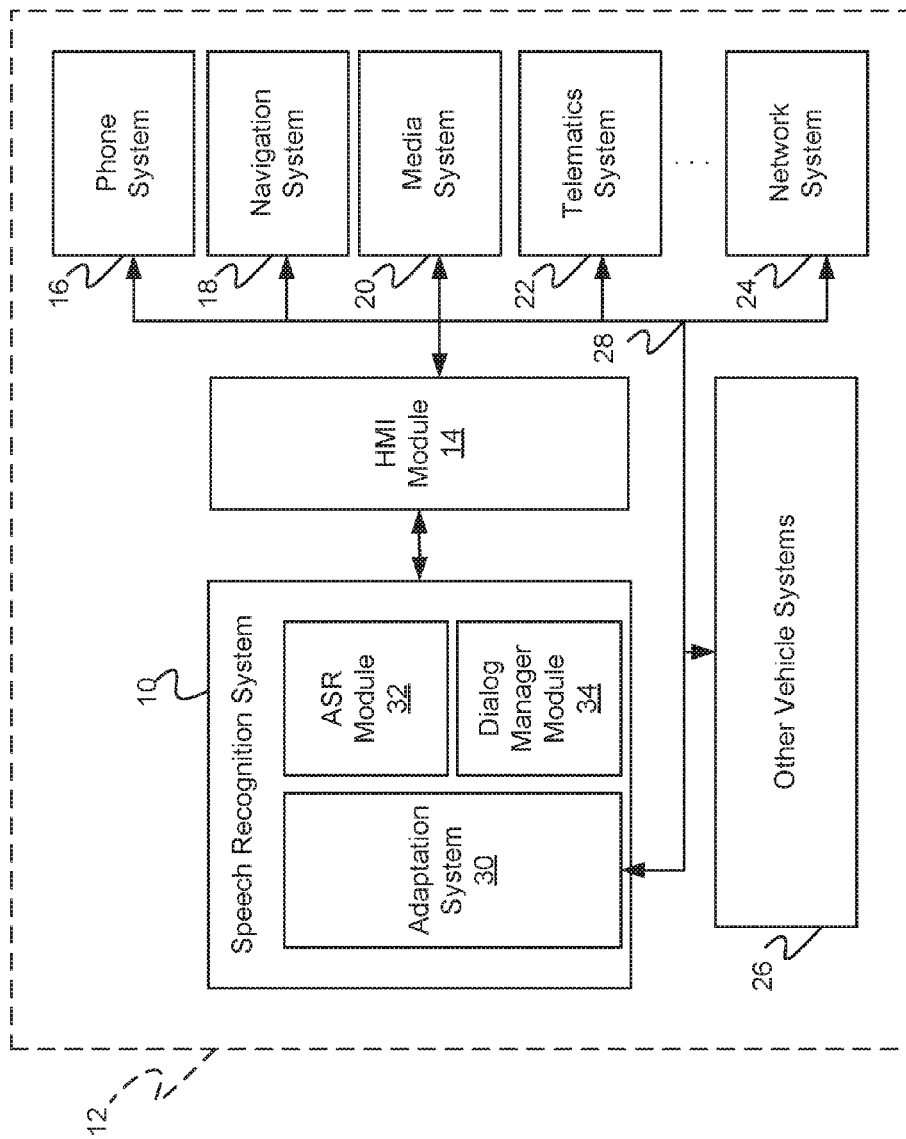
FIG. 1 is a functional block diagram of a vehicle that includes a speech system in accordance with various exemplary embodiments.

With initial reference to FIG. 1, in accordance with exemplary embodiments of the present disclosure, a speech system 10 is shown to be included within a vehicle 12. The speech system 10 provides speech recognition and a dialog for one or more vehicle systems through a human machine interface module (HMI) module 14. Such vehicle systems may include, for example, but are not limited to, a phone system 16, a navigation system 18, a media system 20, a telematics system 22, a network system 24, or any other vehicle system that may include a speech dependent application. As can be appreciated, one or more embodiments of the speech system 10 can be applicable to other non-vehicle systems having speech dependent applications and thus, is not limited to the present vehicle example. For exemplary purposes, the speech system 10 will be discussed in the context of the vehicle example.

The speech system 10 communicates with the multiple vehicle systems 16-24 and/or other vehicle systems 26 through the HMI module 14 and a communication bus and/or other communication means 28 (e.g., wired, short range wireless, or long range wireless). The communication bus can be, for example, but is not limited to, a CAN bus.

Generally speaking, the speech system 10 includes an adaptation module 30, and automatic speech recognition (ASR) module 32, and a dialog manager module 34. As can be appreciated, the ASR module 32 and the dialog manager module 34 may be implemented as separate systems and/or as a combined system as shown. As can further be appreciated, the modules of speech system 10 can be implemented all on the vehicle 12 or part on the vehicle 12 and part on a remote system such as a remote server (not shown).

The ASR module 32 receives and processes speech utterances from the HMI module 14. Some (e.g., based on a confidence threshold) recognized commands from the speech utterance are sent to the dialog manager module 34. The dialog manager module 34 manages an interaction sequence and prompts based on the command. The adaptation module 30 logs various speech data and interaction data generated from an occupant of the vehicle (e.g., through the HMI module 14), logs data from the various vehicle systems 16-24, and/or logs data from the various other vehicle systems 26 (e.g., that do not include speech applications). The adaptation module 30 performs one or more learning algorithms on the logged data, and adapts one or more components of the speech system 10 based on the learning algorithms. In various embodiments, the adaptation module 30 adapts language models used by the ASR module 32 of the speech system 10. In various other embodiments, the adaptation module 30 adapts prompts, and interaction sequences used by the dialog manager module 34 of the speech system 10.

As shown, the adaptation module 30 is included in the speech system 10. As can be appreciated, in alternative embodiments, the adaptation module 30 may be implemented, for example, in the HMI module 14 or as a stand-alone application that communicates with the speech system 10. Thus, the disclosure is not limited to the present example.

Figure 2:
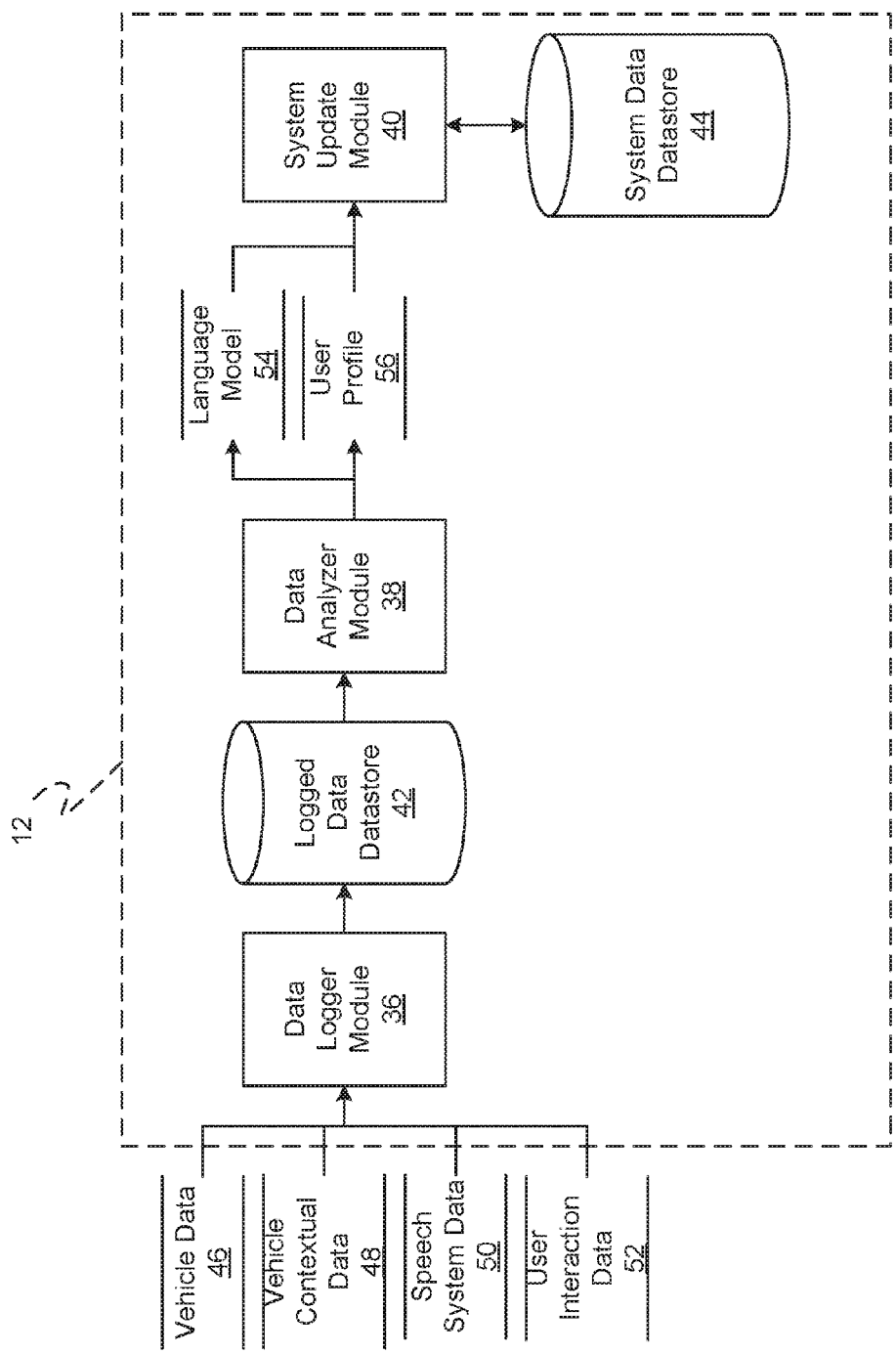
FIGS. 2 through 6 are dataflow diagrams illustrating an adaptation module of the speech system in accordance with various exemplary embodiments.
Figure 3:
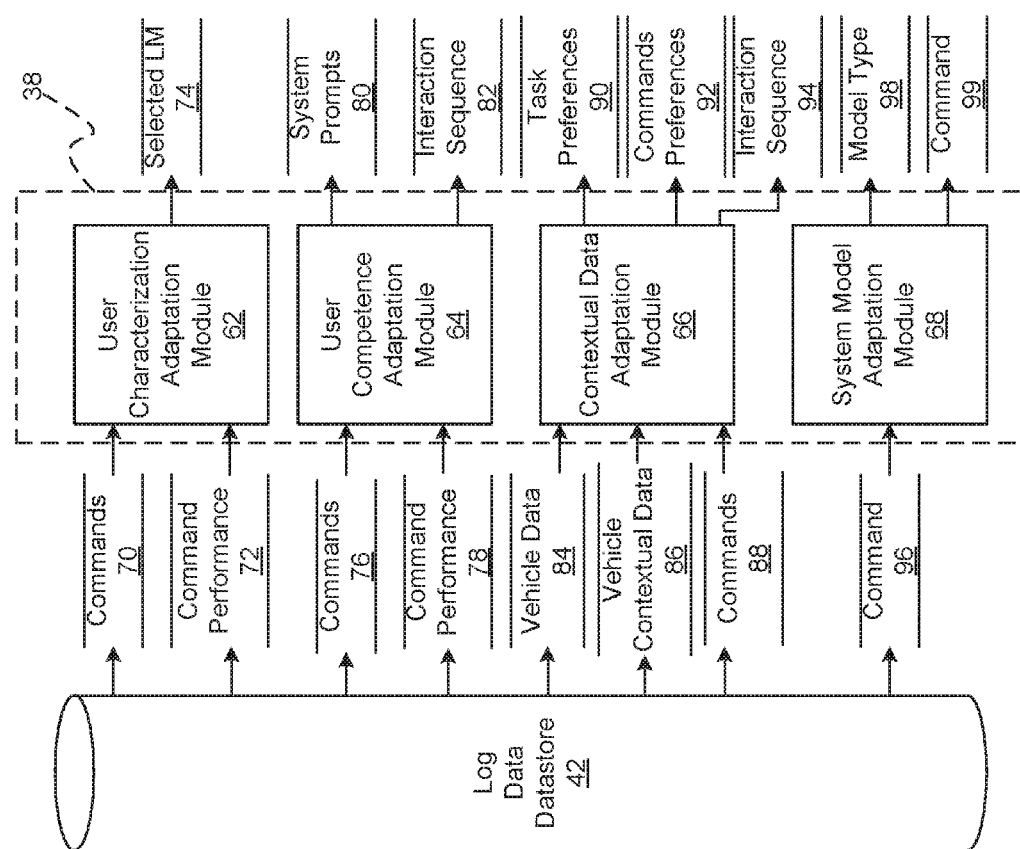

Referring now to FIG. 2, a dataflow diagram illustrates the adaptation module 30 in accordance with various embodiments. As can be appreciated, various embodiments of adaptation modules 30, according to the present disclosure, may include any number of sub-modules. For example, the sub-modules shown in FIG. 2 may be combined and/or further partitioned to similarly adapt portions of the speech system 10 (FIG. 1).

In various exemplary embodiments, the adaptation module 30 includes a data logger module 36, a data analyzer module 38, a system update module 40, a log data datastore 42, and a system data datastore 44. The datastores 42, 44 may temporarily or permanently store data of the system 10.

The data logger module 36 logs data from various sources of the vehicle 12 (e.g., the vehicle systems 16-24 and/or the other vehicle systems 26) in the log data datastore 42. The data can include, for example, but is not limited to, vehicle data 46, vehicle context data 48, speech system data 50, and user interaction data 52. The vehicle data 46 can include, for example, speed data, ambient noise level data, passenger data (e.g., a number of passengers detected in the vehicle 12), vehicle system data (e.g., a number of vehicle systems enabled), etc. The vehicle context data 48 can include, for example, vehicle location data, road type data, weather data, traffic data, etc. The speech system data 50 can include, for example, spoken commands data (e.g., data about commands spoken by an occupant of the vehicle 12), and performance data (e.g., data about the recognition performance of the spoken commands). The user interaction data 52 can include, for example, interaction sequence data, frequency data of user requests, and data from other HMI modalities, such as touch screen gesture interaction data or display data.

The data analyzer module 38 retrieves the logged data from the log data datastore 42 and analyzes the logged data to determine whether to adapt one or more language models used by the speech system 10, whether to adapt prompts presented by the speech system 10, and/or whether to adapt interaction sequences or dialogs provided by the speech system 10. If it is determined that one or more of the language models, the prompts, and the interaction sequences should be adapted, proposed updates are generated as an updated language model 54, or as an updated user profile 56 that includes updated prompts and/or updated interaction sequences.

The system update module 40 receives as input the updated language models 54, and the updated user profile 56. The system update module 40 stores or updates language models, prompts, and/or interaction sequences from the system data datastore 44 based on the received inputs. For example, if an updated language model 54 is received, the update language model 54 can be combined with an original model to form a more robust language model, for example, by using the smaller language model (i.e. the updated language model 54) for the shorter history distributions (unigram) and using the more detailed language module (i.e., the stored language module) for the adjusted higher history distribution (trigram). In another example, the user profile 56 including the prompts and/or the interaction sequences can be stored for use with a particular user.

Referring now to FIGS. 3-6, dataflow diagrams illustrate the data analyzer module 38 of FIG. 2 in accordance with various embodiments. As can be appreciated, various embodiments of data analyzer modules 38, according to the present disclosure, may include any number of sub-modules. For example, the sub-modules shown in FIGS. 3-6 may be combined and/or further partitioned to similarly analyze the logged data and adapt portions of the speech system 10. Inputs to the data analyzer module 38 may be retrieved from the log data datastore 42 and/or received directly from the HMI module 14 and/or from one or more of the vehicle systems 16-26. In various embodiments, the data analyzer module 38 includes a user characterization adaptation module 62, a user competence adaptation module 64, a contextual data adaptation module 66, and/or a system model adaptation module 68. As can be appreciated, the data analyzer module 38 can only include one of the shown modules, or may include any combination of the shown modules and is not limited to the present example.

The user characterization adaptation module 62 retrieves logged data from the from the log data datastore 42. In various embodiments, the logged data includes spoken commands 70 that were spoken by the user, and a performance 72 of the spoken commands 70. The user characterization adaptation module 62 analyzes the commands 70 for various characteristics. The characteristics can include, for example, but are not limited to, verbosity, relational talk, information distribution, user demographics, tone of communication (e.g., politeness phrases), age, and gender. In various embodiments, the user characterization adaptation module 62 tracks how often the command 70 is associated with a particular characteristic. Once the command 70 has been associated with the particular characteristic with a certain frequency, the user characterization adaptation module 62 determines a language model 74 based on the characteristics of the command 70 or generates a new language model 74 by combining several language models (with or without weights) based on the characteristics.

Figure 4:
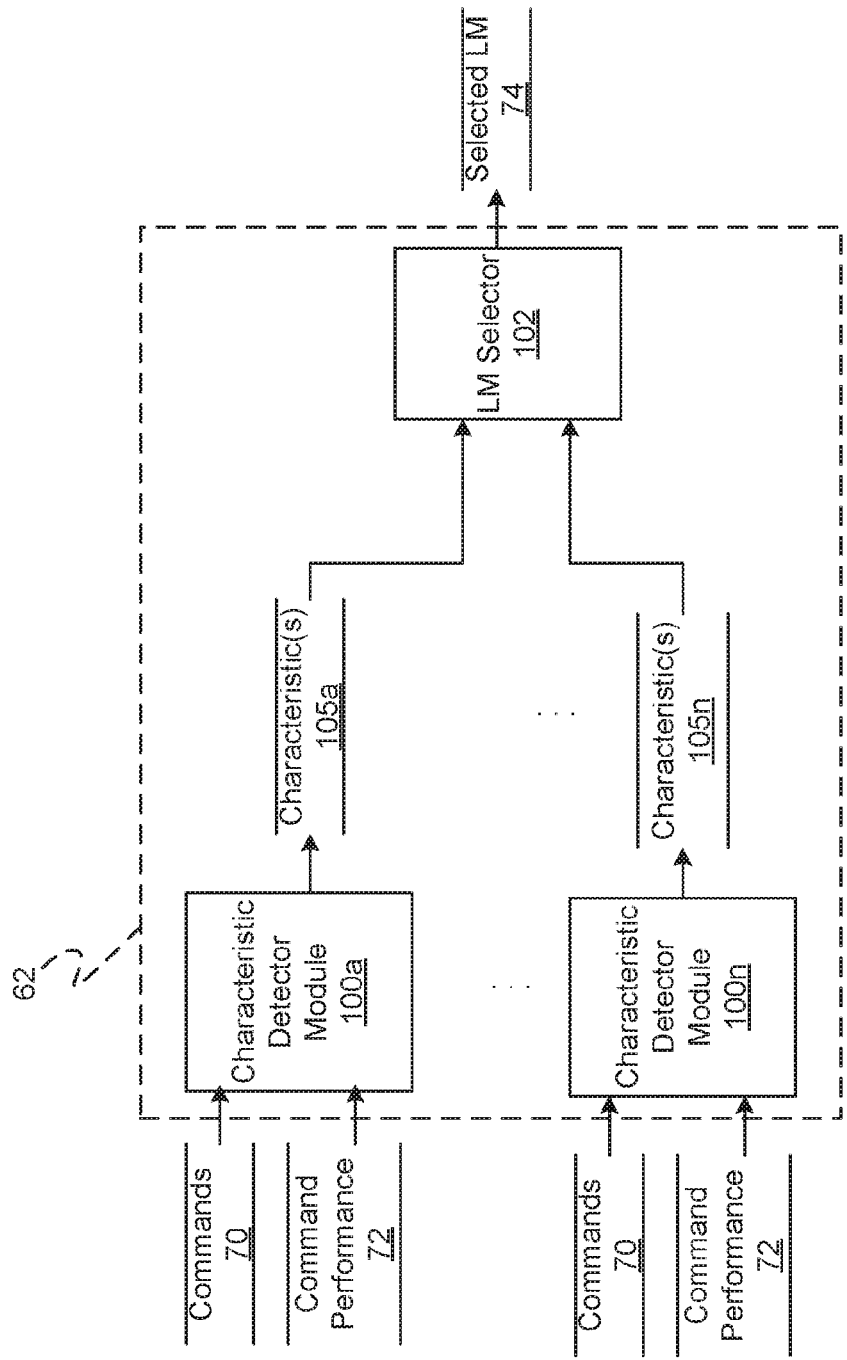

In various embodiments, as shown in FIG. 4, the user characterization adaptation module 62 includes one or more characteristic detector modules 100a-100n and a language model selector and merger module 102. Each characteristic detector module 100 analyzes the command 70 for one or more characteristics 105a-105n. In various exemplary embodiments, the characteristic detector modules 100a-100n output one or more characteristics 105a-105n based on whether the particular command 70 is associated with particular characteristics and/or falls within a particular range of a particular characteristic(s). The language model selector and merger module 102 determines the language model 74 based on the detected characteristic(s) 105a-105n. In various embodiments, the language model selector and merger module 102 determines the appropriate language model 74 from pre-stored models or a weighted combination of the models.

In various embodiments, the characteristic detector modules 100a-100n can be a verbosity detector module, a politeness detector module, an information distribution detector module, a domain distribution detector module, a formality level detector module, an age detector module, a dialect detector module, and/or a gender detector module. The verbosity detector module, for example, analyzes the command 70 and estimates the percentage of decoration and non-functional words in the utterance and compares it to a known distribution of verbosity. The politeness detector module, for example, analyzes the command 70 and extracts all the politeness level indicator words. A weighted amount and relations among the different indicator words are then used to detect the level of politeness. The information distribution detector module, for example, analyzes the command 70 to detect a location and amount of required information pieces (also known as the slot information). Based on this information, the information distribution detector module can detect a user that tends to provide the information as a single utterance and a user that does so piece by piece.

The domain distribution detector module, for example, analyzes the command 70 and detects a domain based on a comparison to historic behavior of the user. The formality level detector module, for example, analyzes the command 70 and extracts the vocabulary. The vocabulary of each level of formality is the basis of the space in which the detection takes place. The level can be determined by applying a normalized distance measure. The age detector module, for example, analyzes the command's utterance and uses a Gaussian Mixture Model (GMM) to compare the utterance to a reference model for each age or age group.

The dialect detector module, for example, analyzes the command 70 and extracts acoustic features. Using, for example, anchor models technique, a signature is generated and distances are measured. The gender detector module, for example, analyzes the command 70, extracts acoustic features and estimates a GMM distribution for each gender. By transforming the GMM to Super Vector (SV) a distance is estimated and decision is made. As can be appreciated, other methods and techniques may be performed by each of the detector modules 100a-100n. Thus, the disclosure is not limited to the present examples.

With reference back to FIG. 3, the user competence adaptation module 64 retrieves logged data from the log data datastore 42. In various embodiments, the logged data includes spoken commands 76 that are spoken by a user, and a performance 78 of the spoken commands 76. The user competence adaptation module 64 analyzes the commands 76 based on the performance 78 of the commands 76. In various embodiments, the performance 78 may generally include parameters and measurements for task completion success and for recurring errors of the user and/or system. For example, the parameters and measurements may pertain to, but are not limited to, task completion rate and time, time out events, response times, confirmation and disambiguation cycles, help requests, and all events, which deviate from an efficient and successful interaction sequence.

The user competence adaptation module 64 analyzes the commands 76 to identify patterns. The user competence adaptation module 64 provides suggested adjustments to prompts 80 and/or adjustments to interaction sequences 82 based on the identified patterns. The suggested adjustments may be provided as part of the user profile 56 (FIG. 2). For example, the prompts 80 in the user profile 56 can be updated to contain more help and a narrower answer space after repeated errors by the user or system are identified; and the prompts 80 in the user profile 56 can be reverted back to original prompts after it is determined that the or system user learns optimal interaction behavior. In various embodiments, the interaction sequences 82 of the user profile 56 can be adapted to provide more system initiative for identified repeated user errors, and can be adapted to allow the user more initiative after it is determined that the user has learned the interaction pattern. This adapting of the user settings based on a user competence promotes improved user competence, and establishes an interaction pattern with a higher task completion rate.

For example, a user may be very familiar with speech systems in general using them frequently to enable applications via his mobile phone. Therefore he has a consistent way to express his request in a one-shot utterance, rarely having to add information later in a subsequent dialog. After the user competence adaptation module 64 gains the perspective and learns this pattern, it may decide to use minimal prompts to keep the dialog efficient and the task completion time short.

In another example, the same user may prefer to perform search requests, such as looking for a restaurant (e.g., a point of interest (POI search)). Based on his mobile phone experience he has developed the habit to go through a large search list and continue the interaction on the display, thoroughly looking into the options and choosing. He may be confused about how to choose by speech when the display will reduce the search content significantly due to the driving situation. After the user competence adaptation module 64 gains the perspective and learns this pattern, it may decide to guide the user step by step and with helpful prompts through this specific dialog situation, so that the user understands over time, how to search through the options.

In still another example, another user may be unfamiliar to speech. He understands the advantage during driving and starts to request by speech calling some of his contacts from his contact list or tuning the radio station. The user speaks overly slow and loud, thus the system has difficulties in recognizing most of the requests. This results in confirmation cycles for falsely recognized contacts or radio stations. The user becomes irritated and hesitates in his answers in these error recovery cycles. The user competence adaptation module 64 observes time out events, long response times, or verbose user utterances for confirmation cycles and guides the user through these situations by adding potential answers, helpful hints, or changing the prompt to strict yes/no answers.

Figure 5:
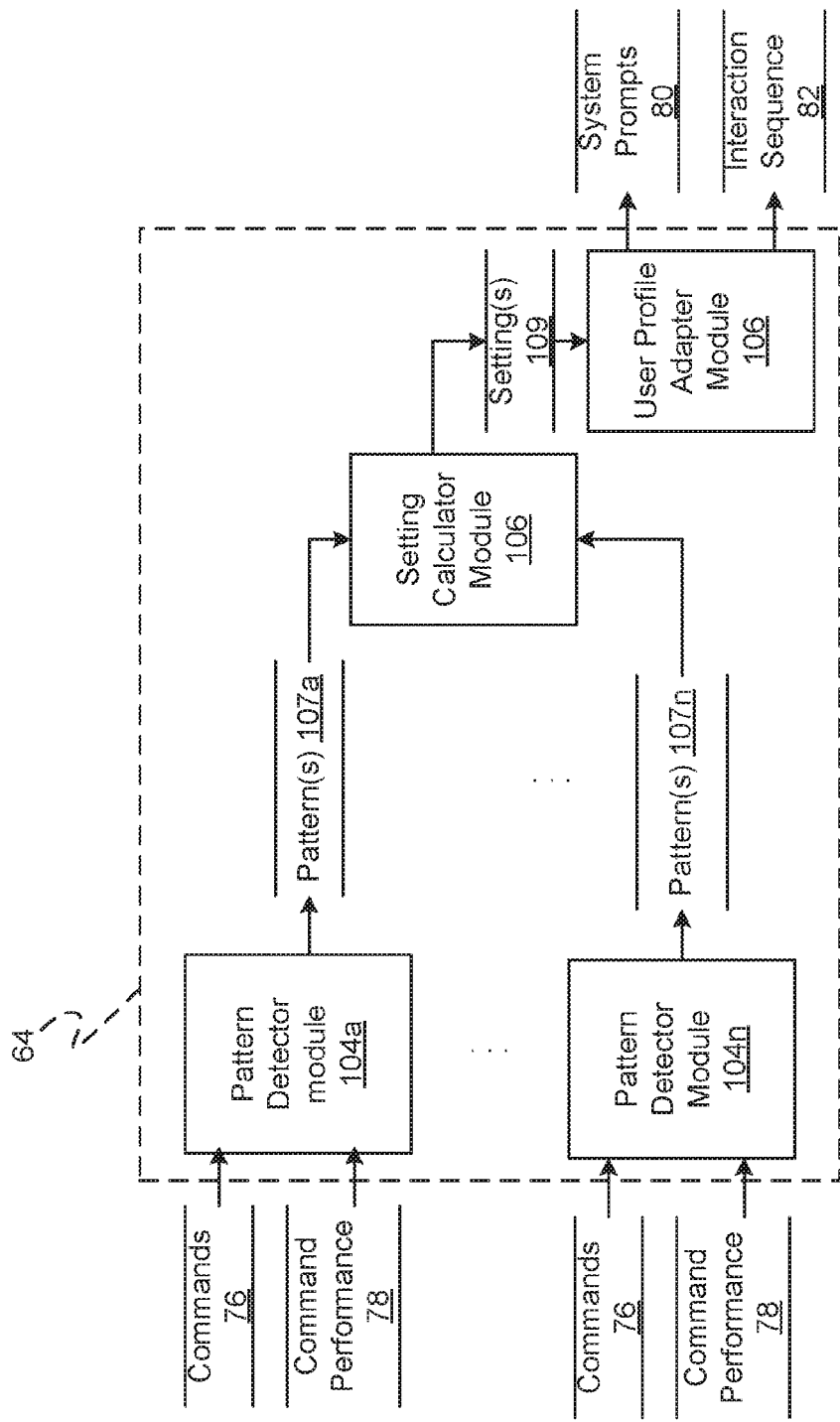

In various exemplary embodiments, as shown in FIG. 5, the user competence adaptation module 64 includes one or more pattern detector modules 104a-104n, one or more setting calculator modules 106, and one or more user profile adapter modules 108. The one or more pattern detector modules 104a-104n analyze the data to identify particular patterns 107a-107n. The one or more setting calculator modules 106 determine settings 109 based on the detected patterns 107a-107n. The one or more user profile adapter modules 108 provide the system prompts 80 and/or the interaction sequences 82 for the user profile 56 (FIG. 2) based on the settings 109.

The pattern detector modules 104a-104n identify patterns 107a-107n relating to, for example, task completion rate and time, time out events, user response times, user deviation from efficiently formulated utterances (e.g., hesitations, pauses, verbosity, etc.), low system confidence resulting in confirmation cycles, ambiguous user utterances resulting in disambiguation cycles, help requests, and all events which deviate from an efficient and successful interaction sequence. When the pattern detector module 104a identifies a pattern relating to task completion rate and time, the setting calculator module 106 generates settings 109 that change system prompts to more informative system prompts when the rate is below a certain threshold. In various embodiments, when the pattern detector module 104a identifies a pattern relating to time out events, user response times, or user deviation from efficiently formulated utterances, the setting calculator module 106 checks a relation to a current dialog step, if the dialog step is recurrently in the same step, the setting calculator module 106 generates settings 109 to change the prompt and the interaction sequence to smaller steps with close system questions for which the user knows easily how to give an answer (e.g., because the possible answer space is narrow).

When the pattern detector module 104a identifies a pattern relating to low system confidence resulting in confirmation cycles, the setting calculator module 106 generates settings 109 to change the prompts to more informative system prompts, so the user knows what to answer. When the pattern detector module 104a identifies a pattern relating to ambiguous user utterances resulting in disambiguation cycles, the setting calculator module 106 generates settings 109 to change the prompts to system prompts which tell the user how to include enough information in his answer to make it unambiguous. In various embodiments, when the pattern detector module 104a identifies a pattern relating to help requests, the setting calculator module 106 generates settings 109 to change the system prompts to more informative prompts. Such pattern detection can be done by collection of user data regarding recognition confusions of the system, detected, for example, by user rejected or corrected confirmation or disambiguation requests. In such a case, the data is stored in confusion matrices, which show recurring confusions over time.

For all identified patterns listed above, once the pattern detector modules 104a-104n determine that the user's behavior has changed to be more efficient and/or easy to recognize, the setting calculator module 106 generates settings 109 to change the speech system prompts and/or interaction sequence back to an original setting, assuming that the user has gained expertise in the use of the system.

With reference back to FIG. 3, the contextual data adaptation module 66 retrieves logged data from the from the log data datastore 42. In various embodiments, the logged data includes vehicle data 84, vehicle context data 86, and speech system data 88. The vehicle data 84 can include, but is not limited to, vehicle speed data, or any other data available on the communication bus 28. The vehicle context data 86 can include, but is not limited to, a current driving location and time, a road type, traffic information, weather, an ambient noise level, a number of occupants, a number of connected user devices, any enabled Internet or other HMI applications, any enabled vehicle systems (i.e., climate control, active cruise control, lights, transmission gear, windshield wipers, etc.), or any other data available on the communication bus or directly from the vehicle systems 16-26. The speech system data 88 can include, but is not limited to, the speech uttered by the user, the speech performance, and/or other speech characteristics identified by the speech system 10.

The contextual data adaptation module 66 analyzes the logged data and detects recurring patterns between the context in which the user is using the system and the user's interaction behavior when using the speech system 10. The contextual data adaptation module 66 provides updates to user task preferences 90, natural language command preferences 92, and/or interaction sequence preferences 94 based on the patterns. In various embodiments, the suggested adjustments are provided as part of the user profile 56 (FIG. 2).

For example, traffic data provides information about a traffic jam at the route that the driver is driving. Additionally speed data from the CAN bus supports that the driver is in the traffic jam, and safety systems (seat belt settings) suggests that he is alone in the car. By evaluating the logged data, the pattern detector module 110a detects that the user makes a lot of phone calls or dictates emails, SMS, or updates his calendar at such times. The user profile 56 (FIG. 2) is updated to recognize such times and to provide a recognition advantage to these types of requests during these conditions and performs with higher accuracy.

In another example, a driver is driving with other people on the weekend. An initial navigation request suggests a longer drive to a point of interest (POI), which is frequently visited by tourists. Additionally, the driver has connected his iPod and requests to listen to certain songs. By evaluating the logged data, the pattern detector module 110a detects that driver requests POIs and audio tours for POIs on the way and requests to listen to some of his favorite songs or audio tour of the POI from the iPod for such occasions. The user profile 56 (FIG. 2) is updated to recognize such times and to provide a recognition advantage to these types of requests during these conditions and performs with higher accuracy.

Figure 6:
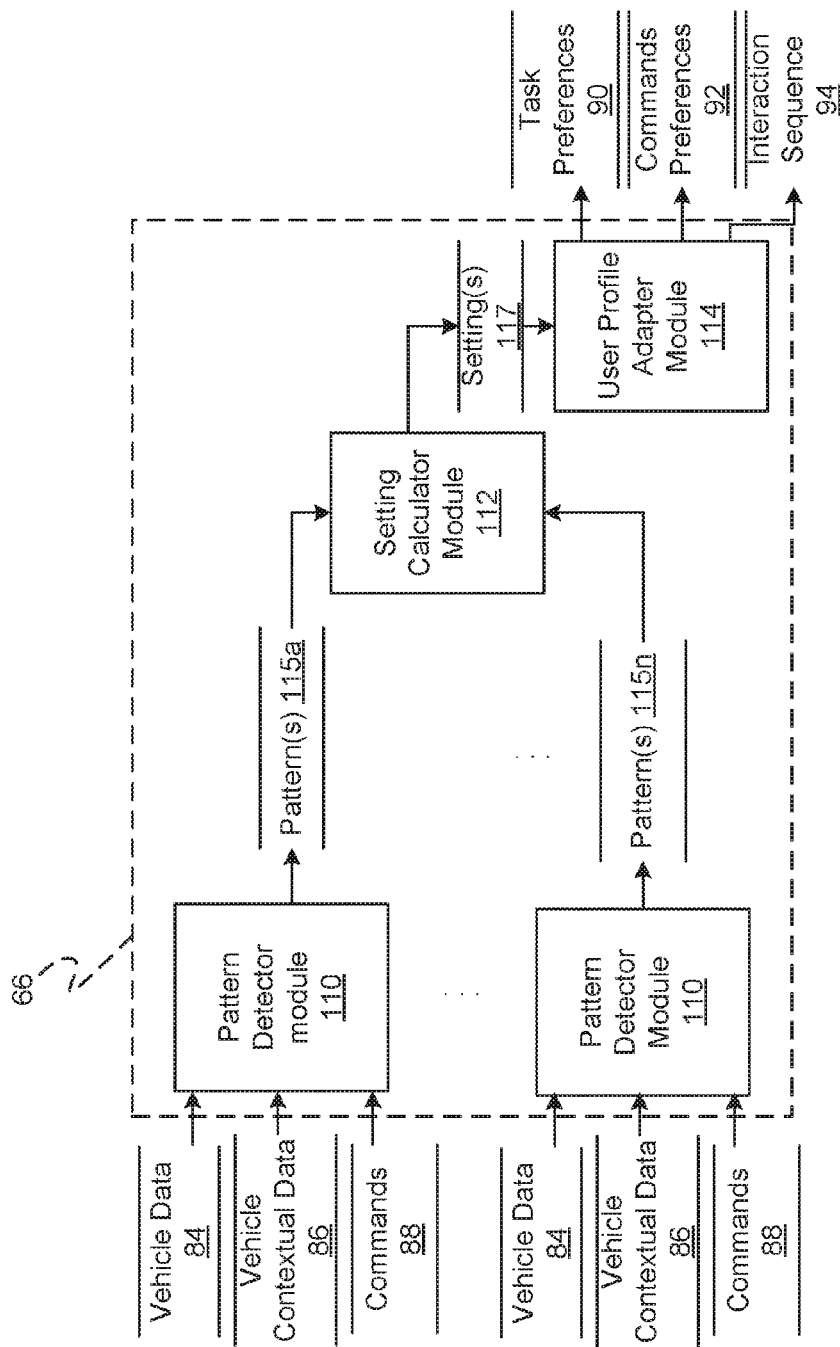

In various exemplary embodiments, as shown in FIG. 6, the contextual data adaptation module 66 can include one or more pattern detector modules 110a-100n, one or more setting calculator modules 112, and one or more user profile adapter modules 114. The pattern detector modules 110a-100n analyze the data for a particular pattern 115a-115n. The pattern detector modules 110a-110n, for example, detect contextual clusters in relation to user requests or request types. The setting calculator modules 112 determine user profile settings 117 based on the detected patterns 115a-115n. The user profile adapter modules 114 provide user task preferences 90, natural language command preferences 92, and/or interaction sequence preferences 94 for use in the user profile 56 (FIG. 2) based on the settings 117.

In various embodiments, the pattern detector modules 110a-110n determine the patterns by determining an increase in user behavior and by determining a pattern of context during the increase in user behavior. User behavior can be of various types and refer to the frequency of performing a certain task type, using a certain vocabulary/language, making recurring errors, or preferring a certain information distribution in his utterances (e.g. providing incremental information in more than one utterance versus saying all information to complete a task in one utterance, etc.). Once a pattern 115a-115n is detected the setting calculator module 112 and the user profile adapter module 114 provide settings 117 and a user profile 56 (FIG. 2) according to the recognized user behavior in the context, for example, according to a task preference, a vocabulary preference, a prompt preference, and/or an interaction sequence.

With reference back to FIG. 3, the system model adaptation module 68 retrieves logged data from the from the log data datastore 42. In various embodiments, the logged data includes a spoken command 96 that is spoken by the user. In various embodiments, the command 96 can be retrieved from the logged data in the log data datastore 42 (as shown), or alternatively can be received in real-time from the HMI module 14 (FIG. 1) as the user speaks the command. The system model adaptation module 68 evaluates the command 96 and determines an optimal model for recognizing the command. For example, the system model adaptation module 68 evaluates the command according to at least three speech models and associates the command of the speech utterance with one of the three models. The system model adaptation module 68 tracks how often the command 96 is associated with the particular model. Once the command 96 has been associated with the particular model with a certain frequency, that model 98 is selected to be updated with the command 99 by adding the command 99 to the model or by removing the command 99 from the model. Additionally or alternatively, a weight or probability that matches an observed frequency of the command 99 or that matches an observed frequency of words, phrases, or transitions from words to words within a command 99 may be associated with the command 99 and the model may be updated with the weight or probability.

Figure 7:
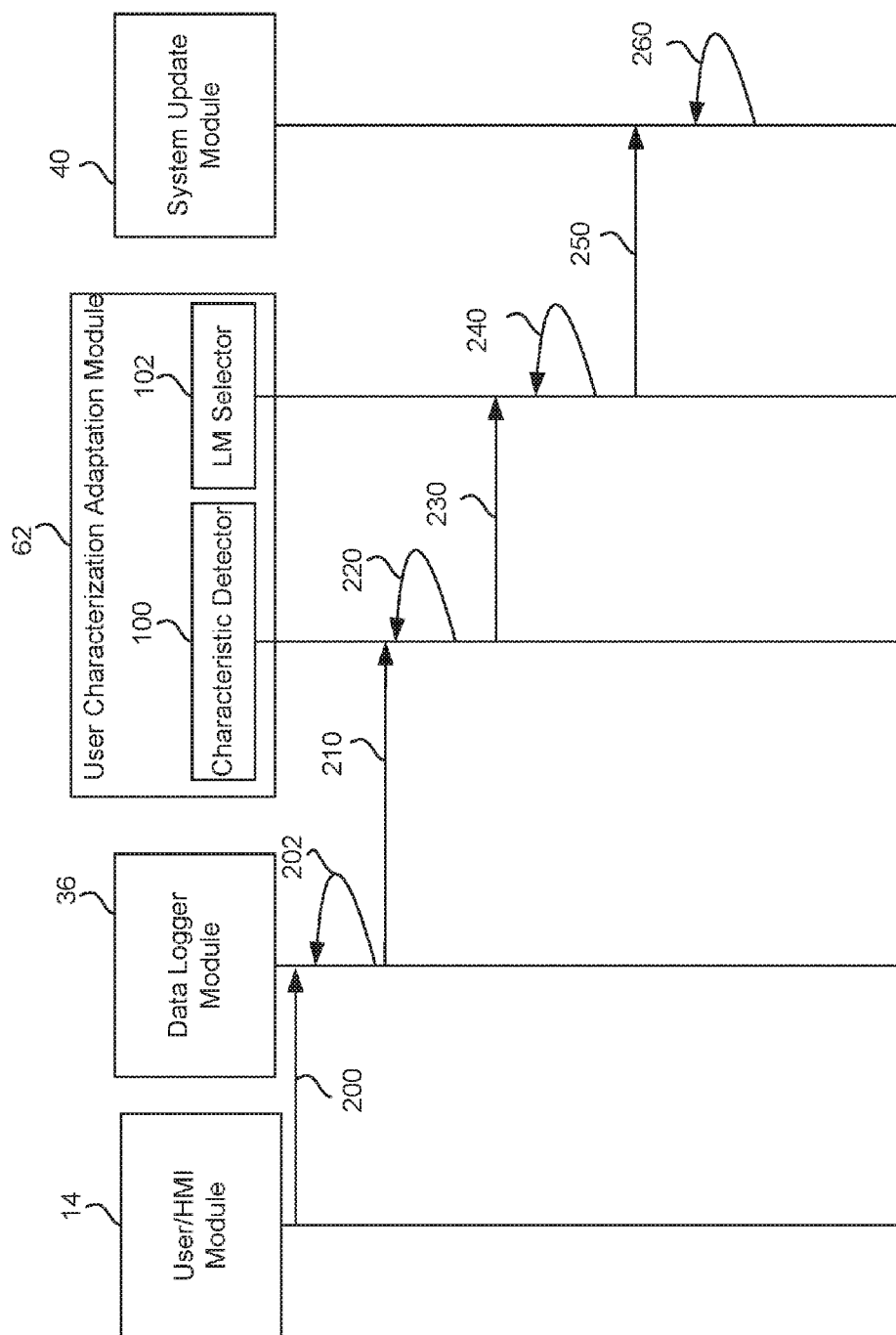
FIGS. 7 through 10 are sequence diagrams illustrating adaptation methods that may be performed by the speech system in accordance with various exemplary embodiments.
Figure 10:
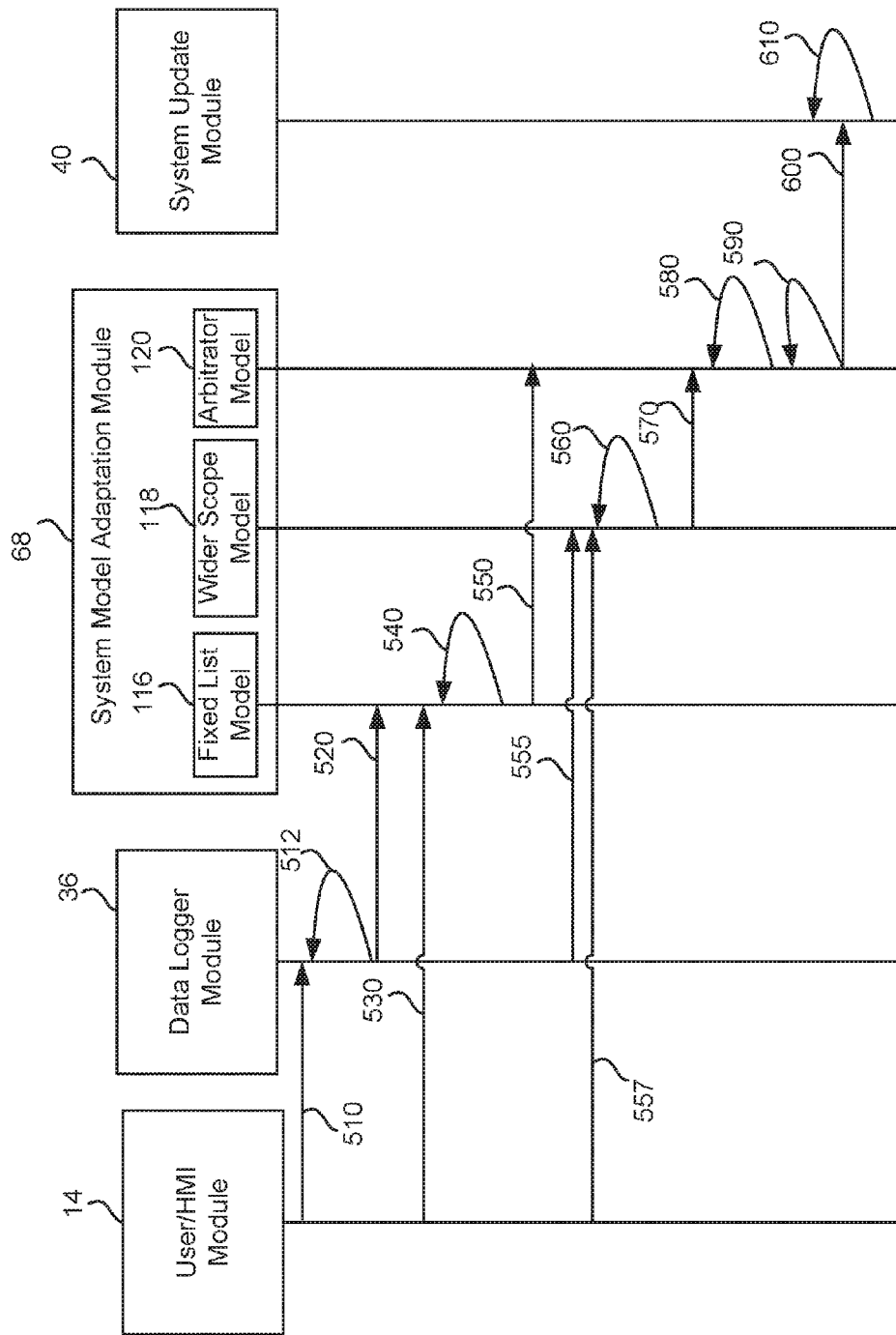

Each model used offers an advantage in at least one of the following: the number of phrases supported, the depth of the phrases, a latency of the processing, the accuracy of the recognition, and the processing time. The combination of the models chosen provides advantages in at least two of the above listed. For example, in various embodiments, the first language model is a fixed model that includes a fixed list of recognizable commands, referred to as a fixed list model 116 (FIG. 10). A fixed list model 116 offers the advantage of improved latency, improved accuracy, and improved processing time and can be considered a more optimal model. Such model can include, but is not limited to a Finite State Grammar (FSG). The second language model has a broader scope of recognition of phrases, referred to as a wider scope model 118 (FIG. 7). A wider scope model 118 recognizes a wider scope of commands however provides higher latency and decreased accuracy. Such model can include, but is not limited to, a Statistical Language Model (SLM). The third language model is a combination between the two models such that it can arbitrate the results of the two language models, referred to as the arbitrator model 120 (FIG. 10). Such model can include, but is not limited to, a Structural Equation Model (SEM). As can be appreciated, the models implemented by the system model adaptation module 68 can be any language models and are not limited to the present examples.

As can be appreciated, the data analyzer module 38 can include one adaptation module or any combination of the above described adaptation modules. In the case where multiple adaptation modules are implemented, the output of an adaptation module may be relied upon by other adaptation modules and or may be combined in some way by the system update module 40 (FIG. 2). By tracking the commands in this manner, and migrating the commands from a less optimal model to a more optimal model, the more optimal model is taken advantage of without sacrificing flexibility of the system. Thus, recognition of the commands will improve over time with significantly less repetition requests or confirmation cycles.

Referring now to FIGS. 7-10 and with continued reference to FIGS. 1-6, sequence diagrams illustrate adaptation methods that may be performed by the speech system 10 in accordance with various exemplary embodiments. As can be appreciated in light of the disclosure, the order of operation within the methods is not limited to the sequential execution as illustrated in FIGS. 7-10, but may be performed in one or more varying orders as applicable and in accordance with the present disclosure. As can further be appreciated, one or more steps of the methods may be added or removed without altering the spirit of the method.

With reference to FIG. 7, a sequence diagram illustrates an exemplary sequence that may be performed to adapt the speech system 10 based on user characterization. As shown, the commands, any contextual information, and their performance are received at 200 from, for example, the HMI module 14 (or communication bus 28) and logged by the data logger module 36 at 202. The logged data is retrieved from the log data datastore 42 at 210 and evaluated by the one or more characteristic detector modules 100a-100n at 220. The language model selector and merger module 102 then evaluates the identified characteristics 105a-105n to see if the characteristic occurred with a certain frequency (e.g., X number of times, where X is a configurable number greater than one) and confidence at 230. If the characteristic has occurred with a certain frequency, a language model 74 associated with the characteristic is selected and provided to the system update module 40 for updating at 240. The system update module 40 receives the language model 74 at 250 and updates a current language model using the language model 74 (e.g., by combing the two models, or in some other manner) at 260.

Figure 8:
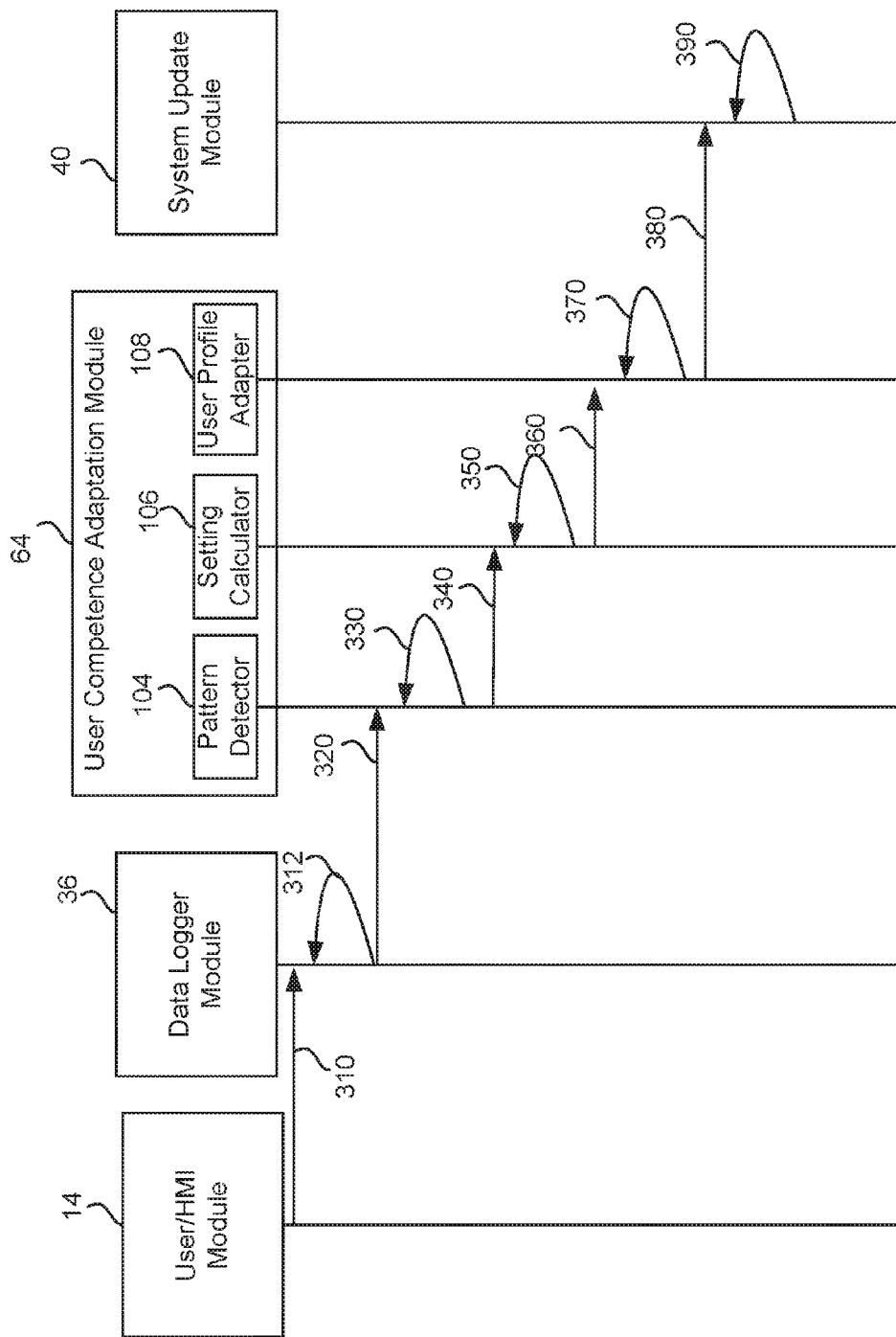

With reference to FIG. 8, a sequence diagram illustrates an exemplary sequence that may be performed to adapt the speech system 10 based on user competence. As shown, the commands and performance data are received at 310, for example, from the HMI module 14, and logged by the data logger module 36 at 312. The logged data is retrieved from the log data datastore 42 at 320. The pattern detector modules 104a-104n evaluate the logged data and compile recurring patterns 107a-107n associated with user competence at 330. The patterns 107a-107n are sent to the settings calculator module 106 at 340. Based on the patterns 107a-107n, the settings calculator module 106 calculates recommended system interaction settings 109 for the overall interaction strategy (e.g. general verbosity level of prompts) and/or for specific dialogue situations (e.g. confirmation in specific context) at 350. The user system interaction settings 109 are sent to the user profile adapter module 108 at 360. The user profile adapter module 108 adapts the settings of the user profile at 370. The user profile is sent to the system update module 40 at 380. The system update module 40 updates the system settings with the adapted user profile at 390.

Figure 9:
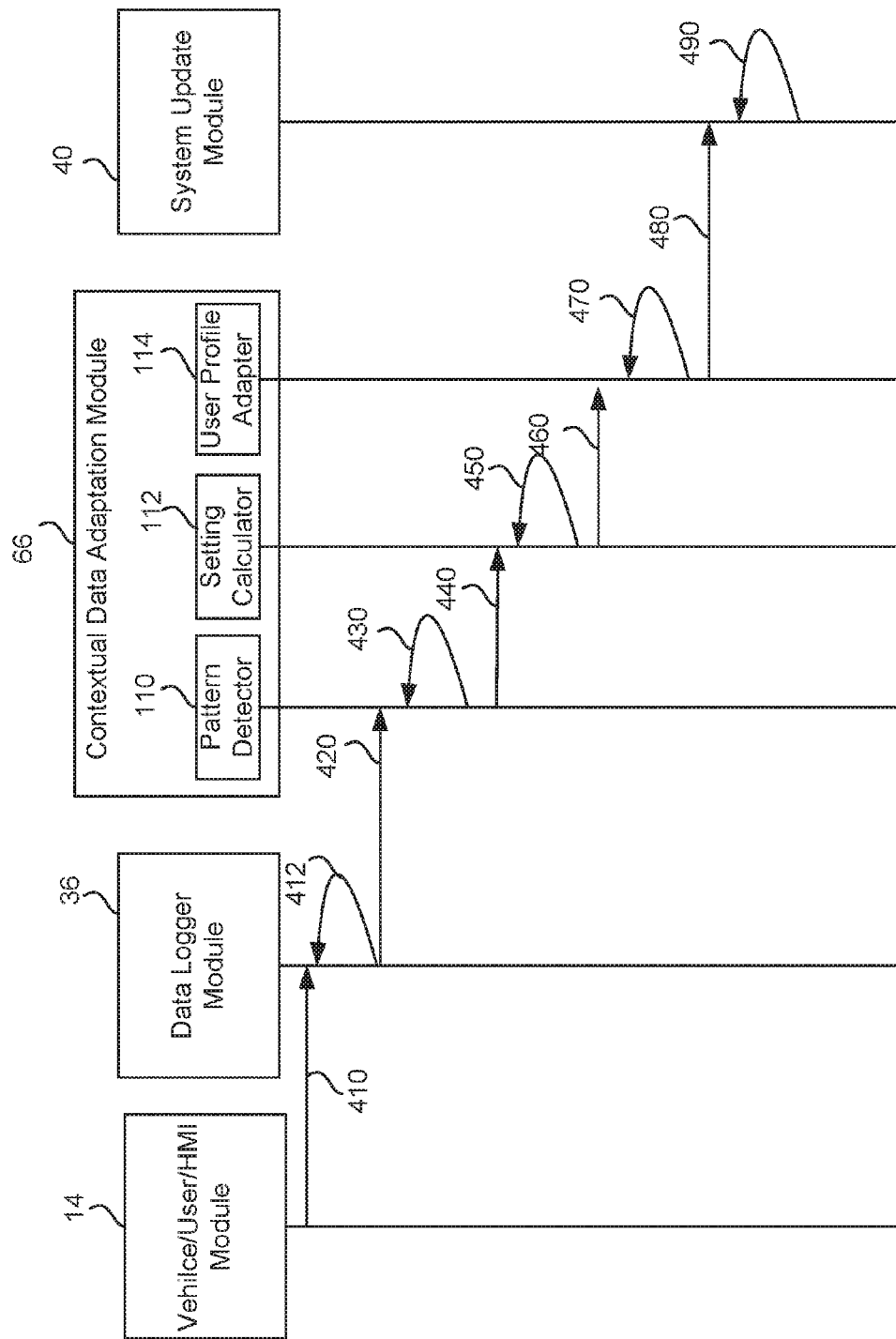

With reference to FIG. 9, a sequence diagram illustrates an exemplary sequence that may be performed to adapt the speech system 10 based on contextual data. As shown, the vehicle data 84, the contextual data 86, and the speech system data 88 are received at 410 and logged by the data logger module 36 at 412. The logged data is retrieved from the log data datastore 42 at 420. The pattern detector modules 110a-110n evaluate the logged data and compiles recurring patterns 115a-115n associated with data from other HMI module 14 (e.g. navigation system, cluster stack, Internet info) or logging systems of the vehicle (CAN bus), context data, such as current driving location and time, road type, traffic, weather, driving speed, ambient noise level, number of occupants, connected user devices, enabled Internet or other HMI applications, enabled vehicle systems, such as climate control, active cruise control, lights, transmission gear, windshield wipers, etc. at 430.

The patterns 115a-115n are sent to the settings calculator module 112 at 440. Based on the patterns 115a-115n, the settings calculator module 112 determines recommended system interaction settings 117 for the overall interaction strategy (e.g. general verbosity level of prompts) and/or for specific dialogue situations (e.g. confirmation in specific context at 450. The user system interaction settings are sent to the user profile adapter module 114 at 460. The user profile adapter module 114 adapts the settings of the user profile at 470. The user profile is sent to the system update module 40 at 480. The system update module 40 updates the system settings with the adapted user profile at 490.

With reference to FIG. 10, a sequence diagram illustrates an exemplary sequence that may be performed to adapt the speech system 10 based on adapted system models. As shown, the command is received at 510, for example, from the HMI module 14, and logged by the data logger module 36 at 512. The command is retrieved from the log data datastore 42 at 520. Alternatively, the command 96 is directly received from the HMI module 14 at 530. The command 96 is processed by the system model adaptation module 68 to determine the optimal language model for the command. For example, the command 96 is processed by the fixed list model 116 at 540 and sent to the arbitrator model 120 at 550. The command 96 is simultaneously or shortly thereafter, retrieved from the log data datastore 42 at 555 and processed by the wider scope model 118 at 560. Alternatively, the command 96 is directly received from the HMI module 14 at 557 and processed by the wider scope model 118 at 560.

The results of the wider scope model 118 are sent to arbitrator model 120 at 570. The results of the fixed list model 116 and the wider scope model 118 are processed by the arbitrator model 120 at 580. The results of the arbitrator are evaluated to see if the result has occurred with a certain frequency (e.g., X number of times, where X is a configurable number greater than one) at 590. If the result of the arbitrator has occurred with a certain frequency, the result and the model are provided to the system update module 40 for updating at 600. The system update module receives the result and the model and updates the system model with the result at 610.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of adapting a speech system, comprising:
   logging speech data from the speech system;
   processing the speech data, by a plurality of characteristic detector modules, to detect a plurality of user characteristics from the speech data, the plurality of characteristic detector modules each map the speech data into at least one category associated with at least one user characteristic of the plurality of user characteristics, the user characteristics comprise characteristics that are specific to behavior of a user of a vehicle when saying a command to an automated system;
   tracking a frequency of each of the plurality of user characteristics; and
   when the frequency of at least one of the plurality of user characteristics reaches a certain frequency, selecting a language model associated with the user of the vehicle, and updating the language model based on the categories of the plurality of the user characteristics.

2. The method of claim 1 wherein the speech data comprises a spoken command uttered by a user when interacting with the speech system and a performance of the spoken command.

3. The method of claim 1 wherein the updating the language model comprises generating a new language model based on the plurality of user characteristics.

4. The method of claim 1 wherein the updating the language model comprises combining a plurality of language models associated with the plurality of user characteristics with at least one other language model.

5. The method of claim 1 wherein the user characteristics comprise at least one of a verbosity detected by a percentage of decoration or non-functional words, an information distribution detected by a delivery method of information, and a domain distribution detected by a domain historic behavior.

6. The method of claim 1 wherein the user characteristics comprise at least one of a politeness, and a formality level.

7. The method of claim 1 wherein the user characteristics comprise at least one of an age, a dialect, and a gender.

8. A system for adapting a speech system, comprising:
   a computer readable medium comprising:
   a first module that, by a processor, logs speech data from the speech system;
   a second module that, by a processor, processes the speech data to detect by a plurality of characteristic detector modules a plurality of user characteristics from the speech data, the plurality of characteristic detector modules each map the speech data into at least one category associated with at least one user characteristic of the plurality of user characteristics, and track a frequency of each of the plurality of user characteristics, the user characteristics comprise characteristics that are specific to behavior of a user of a vehicle when saying a command to an automated system; and
   a third module that, by a processor, when the frequency of at least one of the plurality of user characteristics reaches a certain frequency, selects a language model associated with the user of the vehicle, and updates the language model based on the categories of the plurality of the user characteristics.

9. The system of claim 8 wherein the speech data comprises a spoken command uttered by a user when interacting with the speech system and a performance of the spoken command.

10. The system of claim 8 wherein the third module updates the language model by generating a new language model based on the plurality of user characteristics.

11. The system of claim 8 wherein the third module updates the language model by combining a plurality of language models associated with the plurality of user characteristics with at least one other language model.

12. The system of claim 8 wherein the plurality of user characteristics comprise at least one of a verbosity, an information distribution, and a domain distribution.

13. The system of claim 8 wherein the plurality of user characteristics comprise at least one of a politeness, and a formality level.

14. The system of claim 8 wherein the plurality of user characteristics comprise at least one of an age, a dialect, and a gender.

* * * * *